United States Patent
Azab et al.

(10) Patent No.: US 11,113,465 B2
(45) Date of Patent: Sep. 7, 2021

(54) PERSONALIZED AUTO-TRIAGE OF COMMUNICATIONS

(71) Applicant: International Business Machines Corporation, Armonk, NY (US)

(72) Inventors: Mahmoud Moneeb Abdullatif Azab, Ann Arbor, MI (US); Hamid R. Motahari Nezhad, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 862 days.

(21) Appl. No.: 15/881,216

(22) Filed: Jan. 26, 2018

(65) Prior Publication Data
US 2019/0236486 A1    Aug. 1, 2019

(51) Int. Cl.
*G06F 40/216* (2020.01)
*G06N 5/02* (2006.01)
(Continued)

(52) U.S. Cl.
CPC ........... *G06F 40/216* (2020.01); *G06F 16/35* (2019.01); *G06F 40/30* (2020.01); *G06N 5/022* (2013.01);
(Continued)

(58) Field of Classification Search
CPC ........ G06N 20/00; G06N 5/022; G06N 7/005; G06F 40/30; G06Q 10/107
See application file for complete search history.

(56) References Cited

U.S. PATENT DOCUMENTS 7,882,191 B2   2/2011   Sood
8,032,602 B2*  10/2011  Lavoie ................ H04L 51/26
                                                   709/206
(Continued)

OTHER PUBLICATIONS

Eugene, L. and Caswell, I., Making a Manageable Email Experience with Deep Learning [online], 2015 [retrieved on Dec. 4, 2020], Retrieved from the Internet:< URL: https://cs224d.stanford.edu/reports_2015.html> (Year: 2015).*

(Continued)

*Primary Examiner* — Kamran Afshar
*Assistant Examiner* — Ying Yu Chen
(74) *Attorney, Agent, or Firm* — Sherman IP LLP; Kenneth L. Sherman; Hemavathy Perumal

(57) ABSTRACT

One embodiment provides a method comprising extracting natural language content from a piece of communication for a user, generating a representation of the piece of communication based on the natural language content extracted, and utilizing a global deep learning model and a personalized learning model for the user to assign a priority label to the piece of communication based on the representation and user behavioral information associated with recent conversations of the user. Another embodiment provides a method comprising, for each piece of communication of a set of multiple pieces of communication for multiple users, extracting natural language content from the piece communication and generating a representation of the piece of communication based on the natural language extracted, and training a deep learning neural network to predict a degree of priority of a subsequent piece of communication based on each representation generated.

20 Claims, 12 Drawing Sheets

(51) Int. Cl.
  G06N 7/00      (2006.01)
  G06N 20/00     (2019.01)
  G06Q 10/10     (2012.01)
  G06F 16/35     (2019.01)
  G06F 40/30     (2020.01)
  G06F 16/242    (2019.01)

(52) U.S. Cl.
  CPC .............. *G06N 7/005* (2013.01); *G06N 20/00* (2019.01); *G06Q 10/107* (2013.01); *G06F 16/243* (2019.01)

(56) References Cited

U.S. PATENT DOCUMENTS

| | | | |
|---|---|---|---|
| 9,152,953 | B2 | 10/2015 | Lai et al. |
| 9,324,022 | B2 | 4/2016 | Williams, Jr. et al. |
| 2007/0168430 | A1 | 7/2007 | Brun et al. |
| 2015/0039703 | A1 | 2/2015 | Kursen et al. |
| 2017/0200093 | A1* | 7/2017 | Motahari Nezhad ... G06F 40/30 |
| 2017/0278289 | A1* | 9/2017 | Marino .................... G06T 11/60 |
| 2018/0123993 | A1* | 5/2018 | Song ....................... G06N 20/00 |

OTHER PUBLICATIONS

Yoo, S., Yang, Y. and Carbonell, J., Modeling Personalized Email Prioritization: Classification-based and Regression-based Approaches [online], 2011 [retrieved on Dec. 7, 2020], Retrieved from the Internet: <URL: http://nyc.lti.cs.cmu.edu/yiming/Publications/syoo-cikm2011.pdf> (Year: 2011).*

Le, Q. and Mikolov, T., Distributed Representations of Sentences and Documents [online], 2014 [retrieved on Dec. 13, 2020], Retrieved from Internet:<URL: https://arxiv.org/pdf/1405.4053> (Year: 2014).*

Hamid R. Motahari Nezhad, Kalpa Gunaratna, and Juan Cappi, "eAssistant: Cognitive Assistance for Identification and Auto-Triage of Actionable Conversations", Apr. 2017, 2017 International World Wide Web Conference Committee (IW3C2), pp. 89-98. (Year: 2017).*

Abderdeen, D. et al., "The Learning Behind Gmail Priority Inbox", LCCC: NIPS 2010 Workshop on Learning on Cores, Clusters and Clouds, Dec. 2010, pp. 1-4, United States.

Hershkop, S., "Behavior-based Email Analysis with Application to Spam Detection", 2006, pp. 1-229, Columbia University, United States.

Nussbaum, R. et al., "History-Based Email Prioritization", In Proceedings of the 2009 International Conference on Advances in Social Network Analysis and Mining (ASONAM '09), Jul. 2009, pp. 364-365, IEEE Computer Society, Washington, DC, United States [Abstract Only].

Yoo, S. et al., "Mining social networks for personalized email prioritization", In Proceedings of the International Conference on Knowledge Discovery and Data Mining (SIGKDD), Jun. 2009, pp. 967-976, ACM, United States.

Yoo, S. et al., "Modeling Personalized Email Prioritization: Classification-based and Regression-based Approaches," In Proceedings of the 20th ACM International Conference on Information and Knowledge Management (CIKM '11), Sep. 2011, pp. 729-738, ACM, New York, United States.

Cohen, W.W., "Learning Rules That Classify E-Mail," In AAAI Spring Symposium on Machine Learning in Information Access, 1996, pp. 18-25, AAA1 Technical Report SS-96-05, United States.

Eugene, L. et al., "Making a Manageable Email Experience with Deep Learning," Downloaded from http://cs224d.stanford.edu/reports/EugeneLouis.pdf, Reports for 2015—CS224d Projects, pp. 1-8, Stanford University, United States.

Al Sallab, A.A. et al., "E-Mail Classification Using Deep Networks," Journal of Theoretical and Applied Information Technology, Mar. 31, 2012, pp. 241-251, vol. 37, No. 2.

Kudanova, O., "Deep Learning: An Upcoming Gmail Feature That Will Answer Your Emails for You", Semrush.com, Nov. 4, 2015, pp. 1-2. SEMrush, United States.

* cited by examiner

PERSONALIZED AUTO-TRIAGE OF COMMUNICATIONS

The present invention generally relates to communication management, and more particularly, to personalized auto-triage of communications. The present invention also generally relates to communication management, and more particularly, to deep learning based communication prioritization.

BACKGROUND

Each user may have his/her own preferences in relation to managing pieces of communication exchanged between the user and another user/entity. For example, with respect to prioritizing pieces of communication, one user's perception or point of view with respect to urgency and/or actionable aspects of a piece of communication may differ from another user.

SUMMARY

One embodiment provides a method comprising extracting natural language content from a piece of communication for a user, generating a representation of the piece of communication based on the natural language content extracted, and utilizing a global deep learning model and a personalized learning model for the user to assign a priority label to the piece of communication based on the representation and user behavioral information associated with recent conversations of the user.

Another embodiment provides a method comprising, for each piece of communication of a set of multiple pieces of communication for multiple users, extracting natural language content from the piece communication and generating a representation of the piece of communication based on the natural language extracted. The method further comprises training a deep learning neural network to predict a degree of priority of a subsequent piece of communication based on each representation of each piece of communication of the set of multiple pieces of communication.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
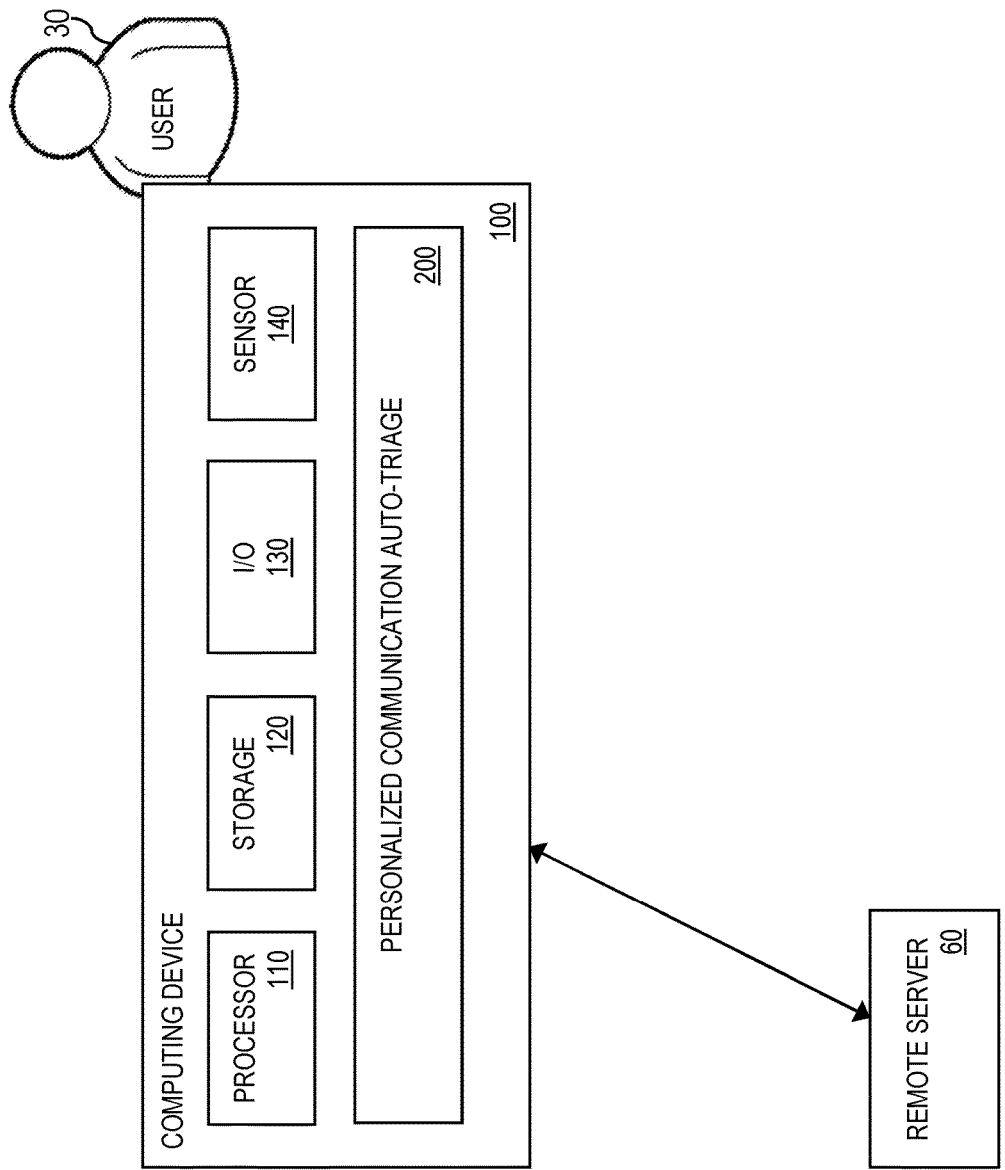
FIG. 1 illustrates an example computer architecture for personalized cognitive communication prioritization, in accordance with an embodiment of the invention.

The detailed description explains the preferred embodiments of the invention, together with advantages and features, by way of example with reference to the drawings.

DETAILED DESCRIPTION

The present invention generally relates to communication management, and more particularly, to personalized auto-triage of communications. One embodiment provides a method comprising extracting natural language content from a piece of communication for a user, generating a representation of the piece of communication based on the natural language content extracted, and utilizing a global deep learning model and a personalized learning model for the user to assign a priority label to the piece of communication based on the representation and user behavioral information associated with recent conversations of the user.

The present invention also generally relates to communication management, and more particularly, to deep learning based communication prioritization. One embodiment provides a method comprising, for each piece of communication of a set of multiple pieces of communication for multiple users, extracting natural language content from the piece communication and generating a representation of the piece of communication based on the natural language extracted. The method further comprises training a deep learning neural network to predict a degree of priority of a subsequent piece of communication based on each representation of each piece of communication of the set of multiple pieces of communication.

For expository purposes, the term "communication" as used herein refers to any type of communication such as, but not limited to, communications to/from a landline phone (e.g., a voice call, a voicemail), communications to/from a mobile phone (e.g., a voice call, a voicemail, a text message), Voice over Internet Protocol (VoIP) communications, communications to/from a satellite phone, electronic mail (email), text messages, physical letters, conversations between two or more users/entities (e.g., a voice call conversation between a caller and a sender, a digital chat between multiple users), and other types of communications.

For expository purposes, the term "priority score" as used herein refers to a numerical score representing a particular degree of priority. In one embodiment, a higher priority score represents a higher degree of priority. The term "priority label" as used herein refers to a descriptive label representing a particular degree of priority. In one embodiment, a pre-determined range of numerical scores is mapped to a priority label. For example, the highest possible priority score may be mapped to a priority label representing the highest degree of priority. The terms "priority label", "priority category", and "priority class" are used interchangeably in this specification.

A user may expect a communication management system to adapt to his/her preferences in relation to managing pieces of communication exchanged between the user and another user/entity. Conventional communication management systems, however, fall short with respect to this expectation. For example, a traditional communication management system may rank emails in order or importance based on interaction history between each sender and receiver of the emails, such as frequency of emails, average time to reply to an email, etc. As another example, a conventional communication management system may utilize an analysis of personal social networks or organizational networks to capture user clusters and obtain features representing each email, and train machine learning classifiers to predict priority of emails based on the features. Such traditional communication management systems, however, do not analyze content of emails, thereby failing to factor in an important source of information. Further, some traditional communication managements systems also require users to manually label their email inboxes for training, which makes it unpractical and also results in requiring a separate learning model for each user.

As another example, a traditional communication management system may utilize machine learning algorithms to rank emails according to priority. Such traditional communication management systems require training a unique learning model for each user based on data for the user, and testing the resulting learning model on the same data. As such traditional communication management systems do not utilize a global deep learning model, the systems require initial feedback from users to be able to apply a resulting learning model to emails.

Another conventional communication management system utilizes learning rules to classify emails. For example, such systems may use term frequency-inverse document frequency (TF-IDF) to identify keywords in emails and build learning to classify emails. The main goal of such systems is to generally classify emails based on topics/subjects identified in the emails, not email prioritization (e.g., ranking/prioritizing emails based on urgency). Further, utilizing learning rules does not make it easy to personalize a learning model to a specific user.

One conventional communication management system utilizes language parsers to extract event deadlines related to action items reference in content of emails, and assigns priority scores to the emails based on the event deadlines. Such systems are rule-based and focus mainly on one type of information (i.e., event deadlines). Further, such systems do not make it easy to personalize a resulting learning model to a specific user.

Another traditional communication management system prioritizes emails based on patterns/rules that exist in the emails. The patterns/rules are established by the user or automatically based on the user's interaction history with other users/entities. For example, the patterns/rules may include token frequency and co-occurrence. Further, such systems assign priority scores to emails, not priority labels.

Unlike the conventional technologies described above, one embodiment provides a communication management system that ranks/prioritizes pieces of communication based on urgency and actionable aspects of the pieces of communication instead of importance (i.e., prioritizing pieces of communication from the perspective of time instead of content). As described in detail later herein, the communication management system provides personalized cognitive communication prioritization from one user's perception or point of view with respect to urgency and actionable aspects of pieces of communication (e.g., the user's perception or point of view as to what constitutes a time-sensitive piece of communication). In one example implementation, given a piece of communication such as an email, the communication management system determines priority (e.g., a priority score) of the piece of communication and classifies the piece of communication into one of multiple categories based on the priority determined (e.g., maps the priority score to a priority label).

FIG. 1 illustrates an example computer architecture 50 for personalized cognitive communication prioritization, in accordance with an embodiment of the invention. The computer architecture 50 comprises a computing device 100 including computation resources, such as one or more processor units 110 and one or more storage units 120. One or more applications may execute/operate on the computing device 100 utilizing the computation resources of the computing device 100. In one embodiment, the applications include, but are not limited to, a personalized communication management system ("personalized communication auto-triage system") 200. As described in detail later herein, the auto-triage system 200 is configured to prioritize one or more pieces of communication for a user 30 (i.e., the user 30 is an intended recipient of the one or more incoming pieces of communication) based on user preferences indicative of a perception or a point of view of the user 30 with respect to urgency and actionable aspects of a piece of communication.

Examples of the computing device 100 include, but are not limited to, a desktop computer, a mobile device (e.g., a tablet, a laptop, a smart phone, etc.), a set-top box, etc.

The computing device 100 may be any type of electronic device, such as, but not limited to, a desktop computer, a mobile device (e.g., a smart phone, a laptop, a tablet, etc.), a wearable device (e.g., a smart watch, etc.), an Internet of Thing (IoT) device (e.g., a smart television, a smart vehicle, a smart house, etc.), a set-top box, a server coupled to a local network, etc.

In one embodiment, the computing device 100 is configured to exchange data with one or more remote servers 60 over a connection (e.g., a wireless connection such as a WiFi connection or a cellular data connection, a wired connection, or a combination of the two). The auto-triage system 200 is configured to receive and/or intercept one or more pieces of communication for the user 30 from a remote server 60. The remote server 60 may be operated/managed by a service provider providing a service to the user 30. For example, the remote server 60 may be an email server operated/managed by an email service provider that the user 30 has an email account with, thereby enabling the auto-triage system 200 to receive and/or intercept incoming emails addressed to the email account. As another example, the remote server 60 may be a server operated/managed by a mobile phone operator that the user 30 has a mobile phone number with, thereby enabling the auto-triage system 200 to receive and/or intercept incoming voice calls, voicemails, notifications, and/or text messages (e.g., SMS, MMS, etc.) sent to the mobile phone number.

In one embodiment, the computing device 100 comprises one or more input/output (I/O) modules 130 integrated in or coupled to the computing device 100, such as a keyboard, a keypad, a touch interface, a display screen, etc. The user 30 may utilize an I/O module 130 to configure one or more user preferences, compose an outgoing piece of communication, provide user feedback, etc.

In one embodiment, the computing device 100 comprises one or more sensor modules 140 integrated in or coupled to the computing device 100, such as a microphone, GPS, etc. The one or more sensor modules 140 may be utilized to collect contextual and/or environmental data. For example, in response to the user 30 receiving an incoming voice call from a caller, the auto-triage system 200 may utilize a microphone of the computing device 100 to record a conversation between the user 30 and the caller. Contextual and/or environmental collected by the one or more sensor modules 140 (e.g., a recording of a conversation) may be utilized as training data for training one or more learning models for personalized cognitive communication prioritization.

Figure 2:
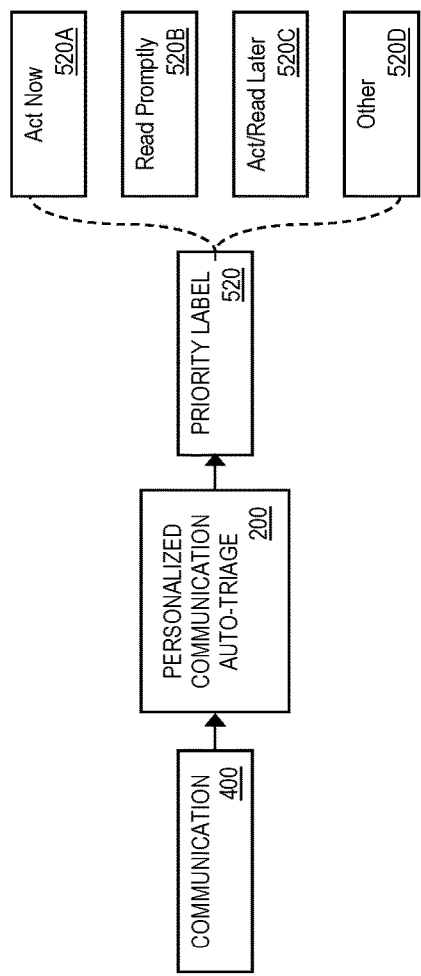
FIG. 2 illustrates different priority labels that may be assigned to a piece of communication, in accordance with an embodiment of the invention.

FIG. 2 illustrates different priority labels that may be assigned to a piece of communication 400, in accordance with an embodiment of the invention. In one embodiment, in response to receiving/intercepting a piece of communication 400 for a user 30, the auto-triage system 200 is configured to: (1) classify the piece of communication 400 into one of multiple categories/classes, and (2) assign a priority label 520 to the piece of communication 400 in accordance with the category/class the piece of communication 400 is classified in.

In one embodiment, the multiple categories/classes may include, but are not limited to, the following: (1) a first priority category/class representing one or more pieces of communication of highest priority, (2) a second priority category/class representing one or more pieces of communication of second highest priority, (3) a third priority category/class representing one or more pieces of communication of third highest priority, and (4) a fourth priority category/class representing one or more pieces of communication of least priority. Each piece of communication 400 assigned the first priority label or a priority score within a first pre-determined numerical range corresponding to the first priority label may be assigned a priority label 520A with label name "Act Now", each piece of communication 400 classified in the second priority category/class may be assigned a priority label 520B with label name "Read Promptly", each piece of communication 400 classified in the third priority category/class may be assigned a priority label 520C with label name "Act/Read Later", and each piece of communication 400 classified in the fourth priority category/class may be assigned a priority label 520D with label name "Other".

Figure 3:
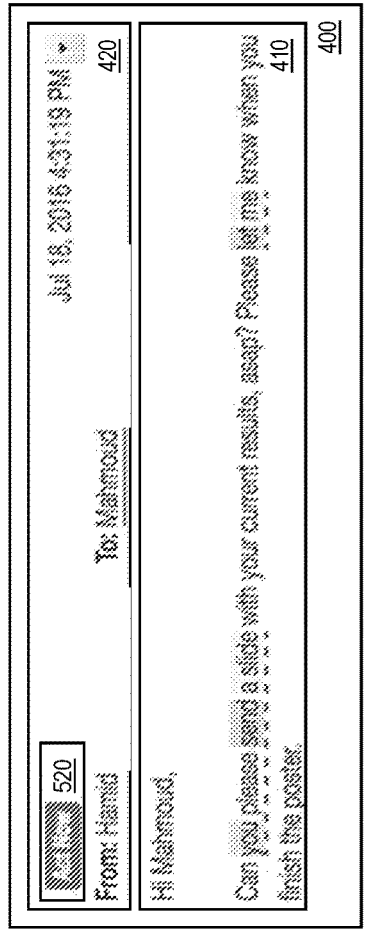
FIG. 3 illustrates an example display of a piece of communication on a display screen, in accordance with an embodiment of the invention.

FIG. 3 illustrates an example display of a piece of communication 400 on a display screen, in accordance with an embodiment of the invention. In one embodiment, in response to the auto-triage system 200 assigning a priority label 520 to a piece of communication 400 for a user 30, the piece of communication 400 may be displayed on a display screen (e.g., a display screen of the computing device 100 or another device of the user 30) with the assigned priority label 520 to notify the user 30 of priority/urgency of the piece of communication 400.

As shown in FIG. 3, each piece of communication 400 comprises textual content 410 and metadata information 420. Textual content 410 of a piece of communication 400 comprises natural language content of the piece of communication 400. For example, if the piece of communication 400 is an email, the textual content 410 comprises natural language content included in a body of the email (e.g., a personal message, a work-related message, a promotional offer, a confirmation message for a reservation/booking, etc.). As another example, if the piece of communication 400 is a voicemail, the textual content 410 comprises natural language content included in a speech-to-text transcript of the voicemail.

Metadata information 420 of a piece of communication 400 comprises information indicative of a source and a destination of the piece of communication 400 (e.g., sender, recipient). For example, if the piece of communication 400 is an email, the metadata information 420 comprises information included in a header of the email, such as, but not limited to, a sender of the email, one or more recipients of the email, a delivery timestamp of the email, one or more email addresses of the one or more recipients, an e-mail address of the sender, etc. As another example, if the piece of communication 400 is a voicemail, the metadata information 420 comprises, but is not limited to, an identity of the caller, a phone number of the caller, a timestamp of the voicemail, etc.

Figure 4:
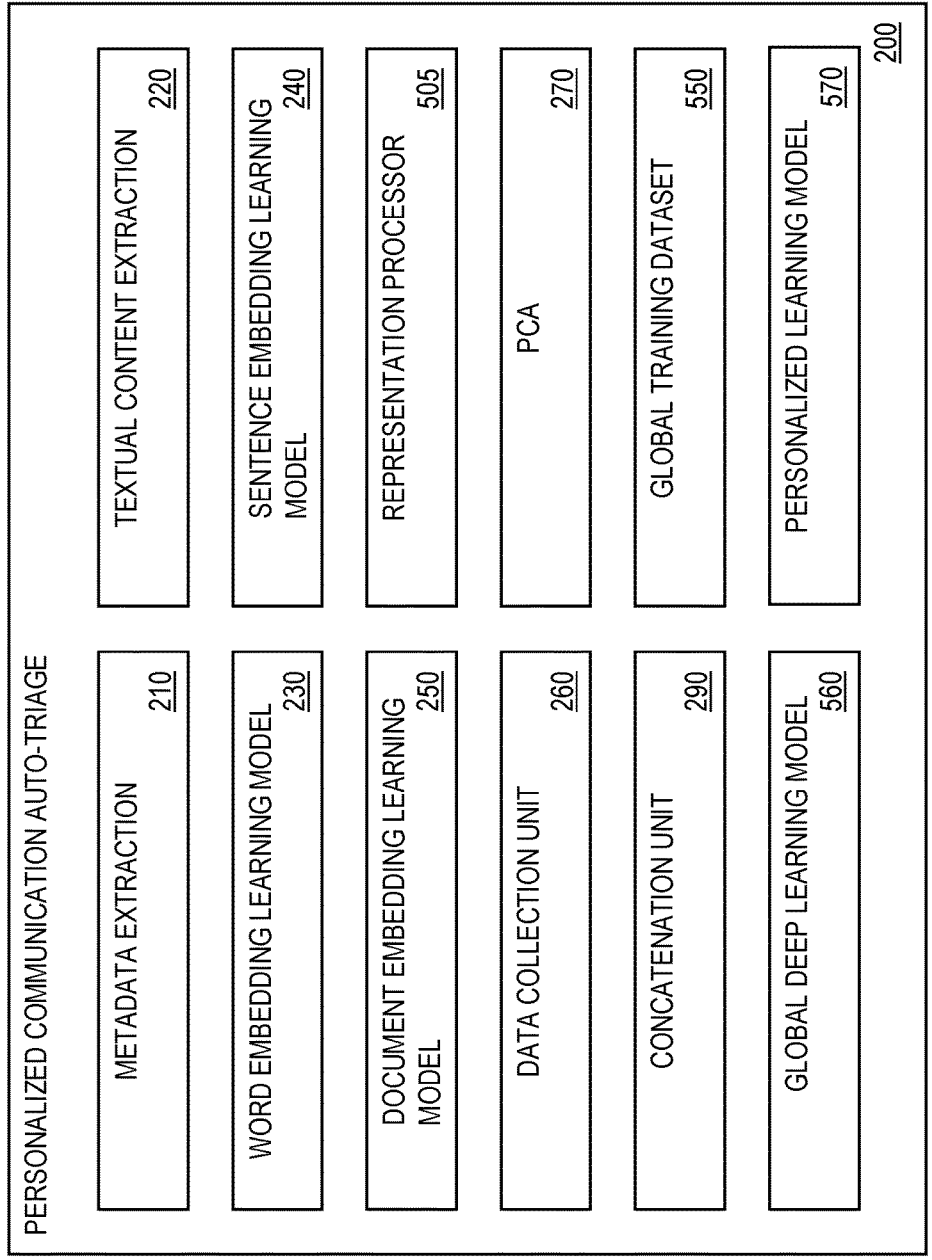
FIG. 4 illustrates an example personalized communication auto-triage system in detail, in accordance with an embodiment of the invention.

FIG. 4 illustrates an example personalized communication auto-triage system 200 in detail, in accordance with an embodiment of the invention.

In one embodiment, the auto-triage system 200 comprises a textual content extraction unit 220 configured to: (1) extract textual content 410 from the piece of communication 400, (2) generate a representation 415 of the piece of communication 400 based on the textual content 410, and (3) forward/feed the representation 415 to a representation processor 505.

In response to receiving the representation 415, the representation processor 505 is configured to generate an output 510 (FIG. 5A) identifying one or more actionable aspects of the piece of communication 400, if any. In one embodiment, the output 510 comprises a single vector. As described in detail later herein, based on a type of the representation 415, the representation processor 505 is either a long short-term memory (LSTM) model (e.g., LSTM model 500A in FIG. 6A or LSTM model 500B in FIG. 6B) or a recurrent neural network (RNN) (e.g., RNN 530 in FIG. 6C).

Figure 6A:
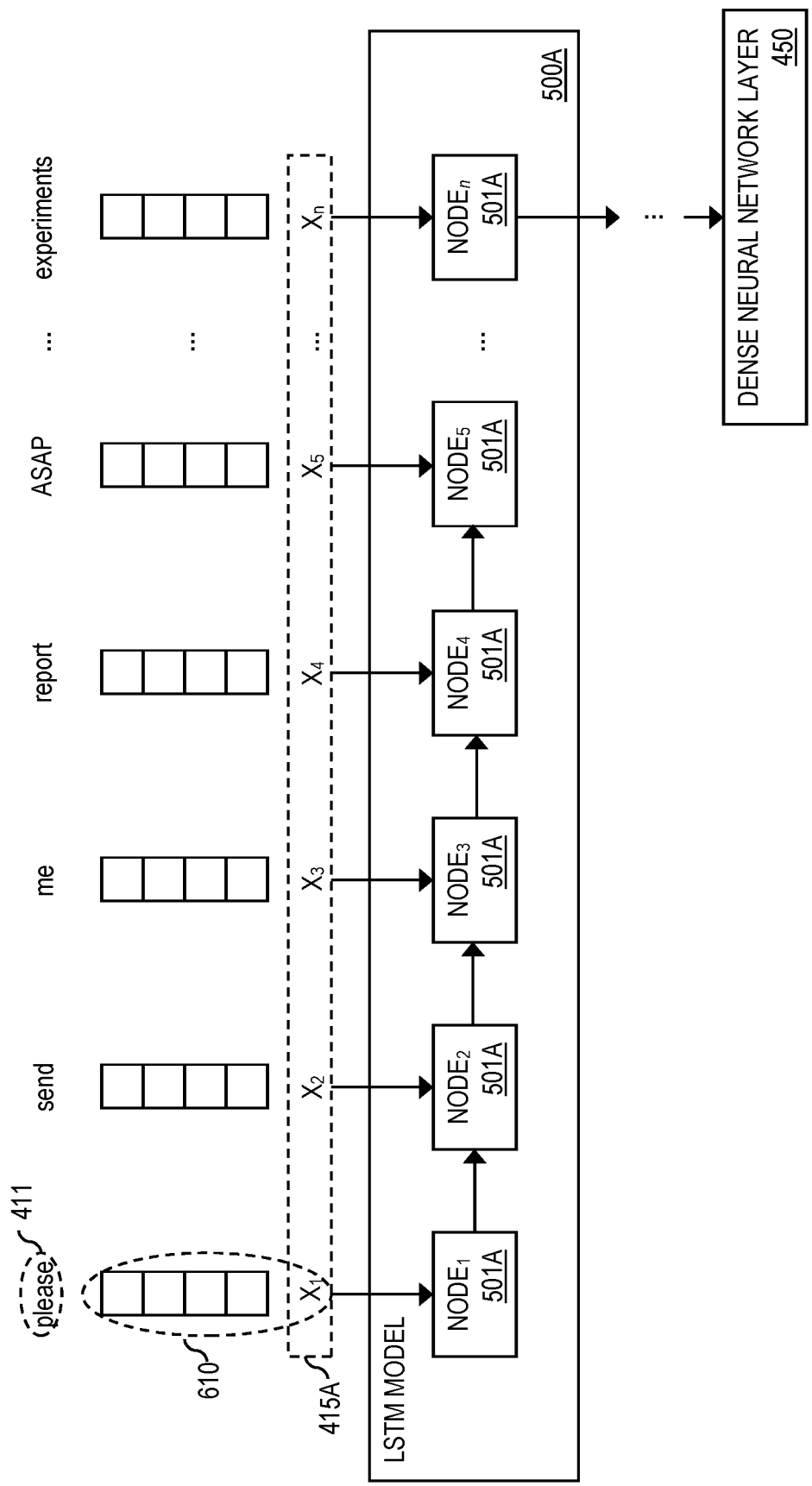
FIG. 6A illustrates an example sequence of words representation of a piece of communication, in accordance with an embodiment of the invention.
Figure 6B:
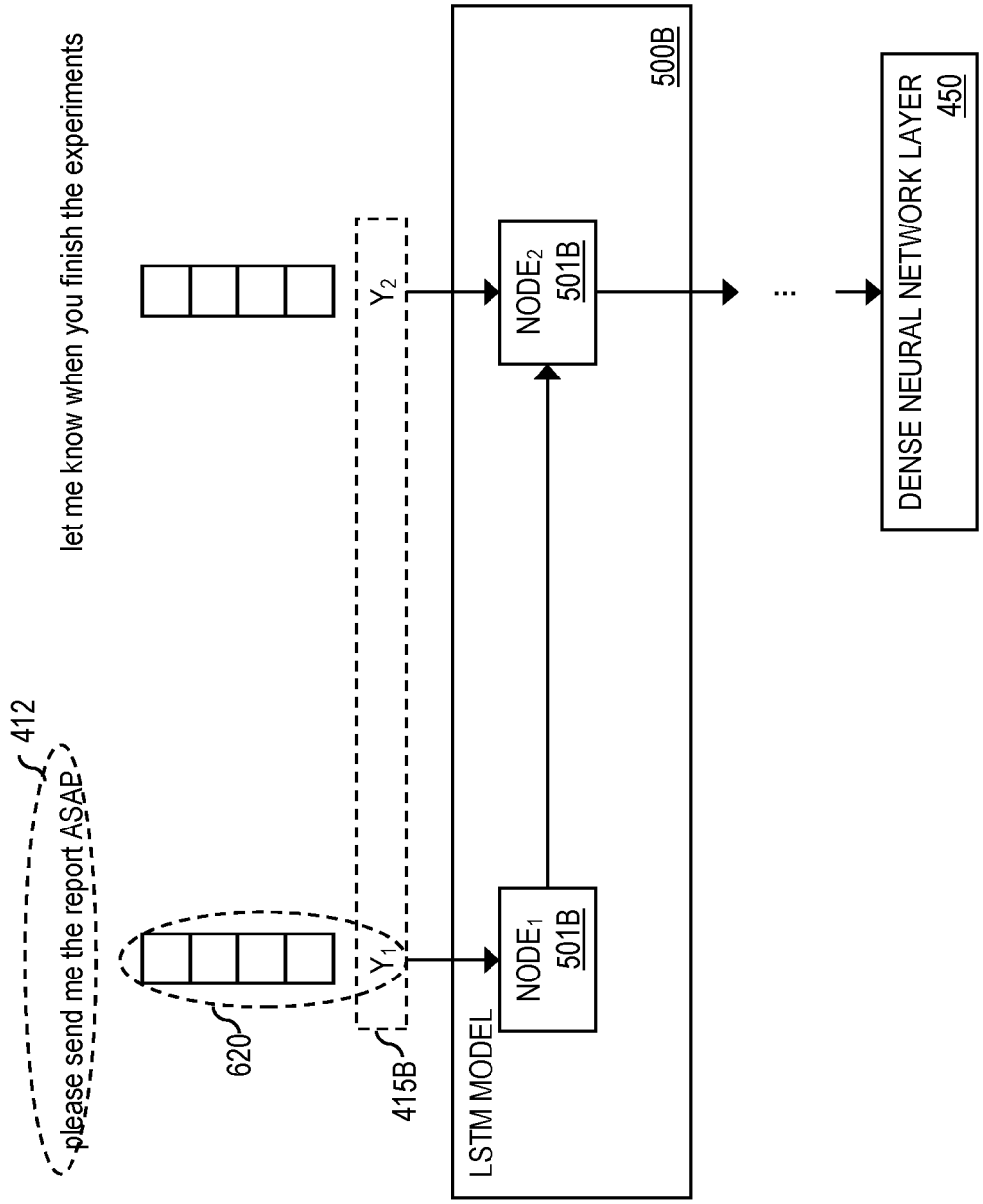
FIG. 6B illustrates an example sequence of sentences representation of a piece of communication 400, in accordance with an embodiment of the invention.
Figure 6C:
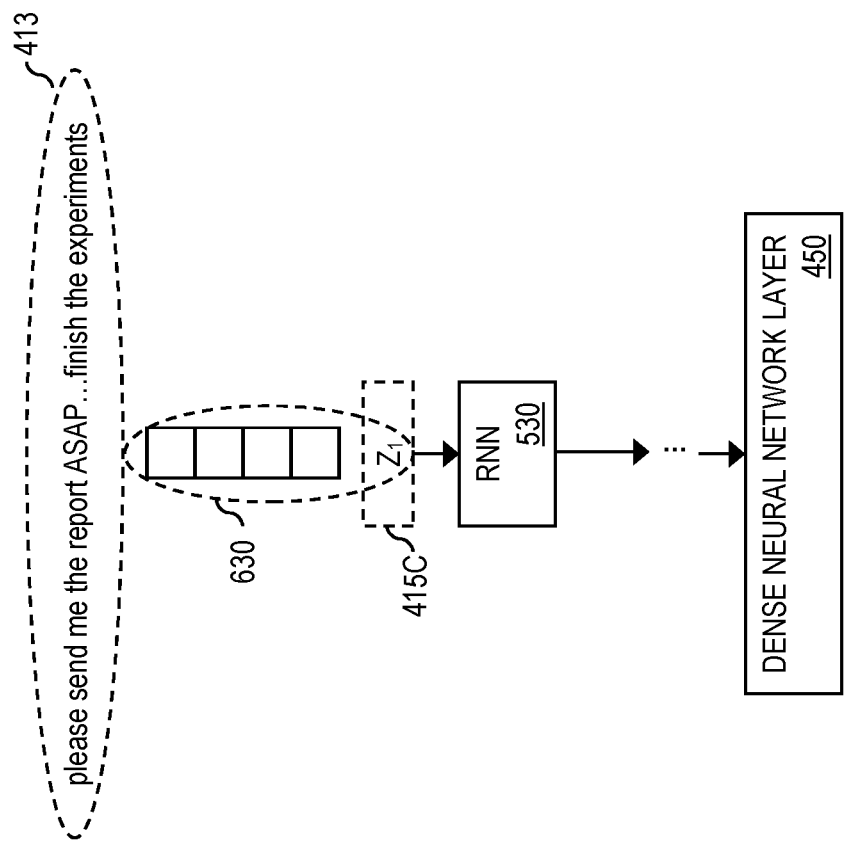
FIG. 6C illustrates an example document embedding representation of a piece of communication 400, in accordance with an embodiment of the invention.

In one embodiment, the representation 415 may be, but is not limited to, one of the following types: (1) a sequence of words representation 415A (FIG. 6A), (2) a sequence of sentences representation 415B (FIG. 6B), or (3) a document embedding representation 415C (FIG. 6C).

In one embodiment, the textual content extraction unit 220 generates, for the piece of communication 400, a sequence of words representation 415A (FIG. 6A) that represents the piece of communication 400 as a sequence of words included in the textual content 410. The sequence of words representation 415A comprises a sequence of word embedding vectors 610 (FIG. 6A). Each word included in the textual content 410 is represented by a corresponding word embedding vector 610 that is included in the sequence of words representation 415A.

Specifically, to generate the sequence of words representation 415A, the textual content extraction unit 220 applies a word embedding learning model 230 to the textual content 410 to obtain the sequence of word embedding vectors 610. The textual content extraction unit 220 forwards/feeds the sequence of word embedding vectors 610 to an LSTM model 500A (FIG. 6A). The LSTM model 500A is configured to generate, based on the sequence of word embedding vectors 610, an output 510 (FIG. 5A) identifying one or more actionable aspects of the piece of communication 400, if any.

The word embedding learning model 230 is trained to learn word embedding space. In one embodiment, training the word embedding learning model 230 involves training an artificial neural network to learn word embedding space based on a global training dataset 550 comprising multiple pieces of communication 400 for multiple users 30 (e.g., the global training dataset 550 may include multiple sequence of words representations 415A of the multiple pieces of communication 400).

Figure 5A:
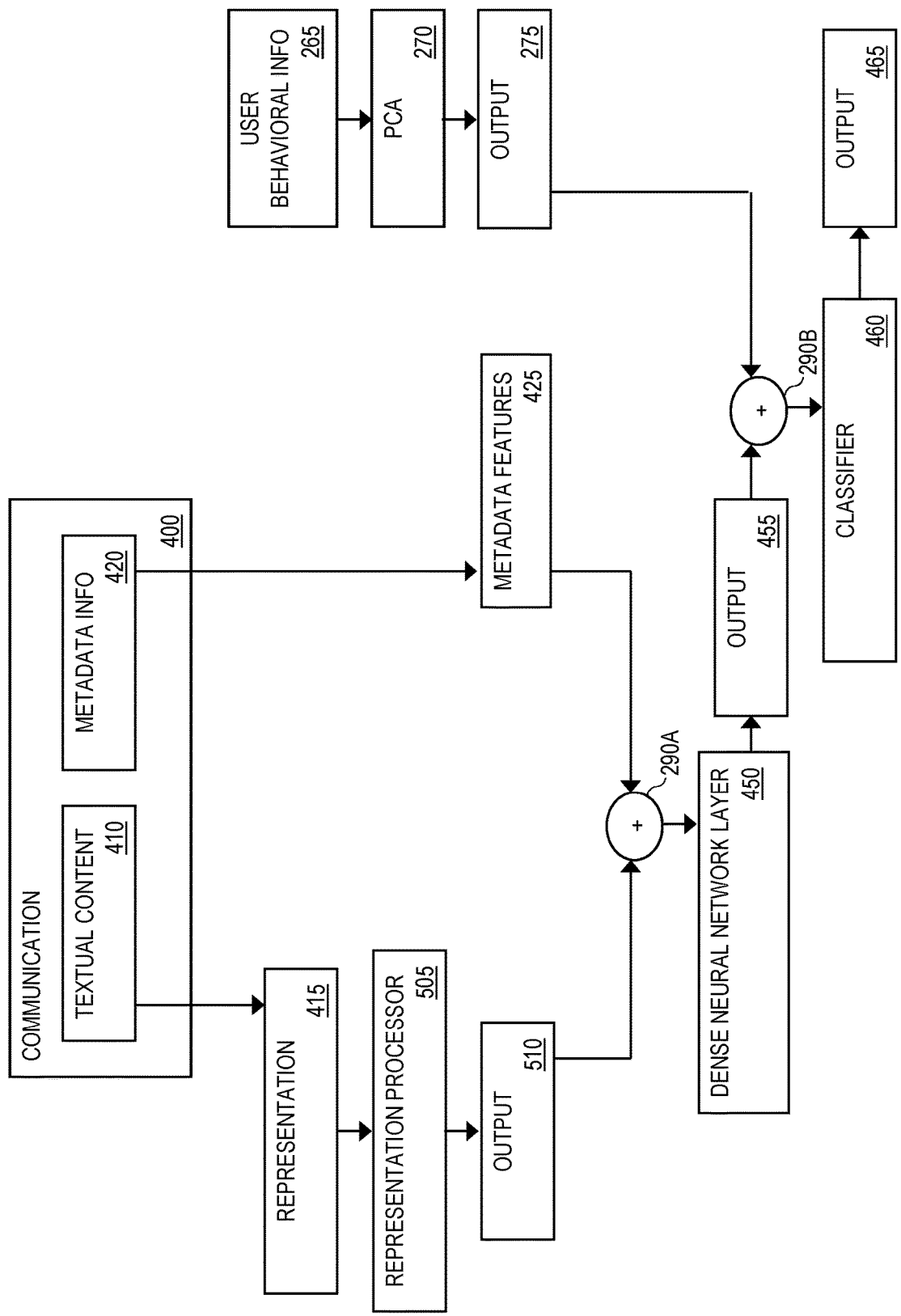
FIG. 5A illustrates an example process implemented by the auto-triage system for determining a priority label to assign to a piece of communication, in accordance with an embodiment of the invention.

In another embodiment, the textual content extraction unit 220 generates, for the piece of communication 400, a sequence of sentences representation 415B (FIG. 6B) that represents the piece of communication 400 as a sequence of sentences included in the textual content 410. The sequence of sentences representation 415B comprises a sequence of sentence embedding vectors 620 (FIG. 6B). Each sentence included in the textual content 410 is represented by a corresponding sentence embedding vector 620 that is included in the sequence of sentences representation 415B. Specifically, to generate the sequence of sentences representation 415B, the textual content extraction unit 220 applies a sentence embedding learning model 240 to the textual content 410 to obtain the sequence of sentence embedding vectors 620. The textual content extraction unit 220 forwards/feeds the sequence of sentence embedding vectors 620 to an LSTM model 500B (FIG. 6B). The LSTM model 500B is configured to generate, based on the sequence of sentence embedding vectors 620, an output 510 (FIG. 5A) identifying one or more actionable aspects of the piece of communication 400, if any.

The sentence embedding learning model 240 is trained to learn sentence embedding space. In one embodiment, training the sentence embedding learning model 240 involves training a distributed representation learner to learn sentence embedding space based on the global training dataset 550 (e.g., the global training dataset 550 may include multiple sequence of sentences representations 415B of the multiple pieces of communication 400).

In yet another embodiment, the textual content extraction unit 220 generates, for the piece of communication 400, a document embedding representation 415C (FIG. 6C) that represents a whole document embedding of the piece of communication 400. The document embedding representation 415C comprises a single document embedding vector 630 (FIG. 6C). A whole document included in the textual content 410 is represented by the document embedding vector 630. Specifically, to generate the document embedding representation 415C, the textual content extraction unit 220 applies a document embedding learning model 250 to the textual content 410 to obtain the document embedding vector 630. The textual content extraction unit 220 forwards/ feeds the document embedding vector 630 to a RNN 530 (FIG. 6C). The RNN 530 is configured to generate, based on the document embedding vector 630, an output 510 (FIG. 5A) identifying one or more actionable aspects of the piece of communication 400, if any.

The document embedding learning model 250 is trained to learn document embedding space. In one embodiment, training the document embedding learning model 250 involves training a distributed representation learner to learn document embedding space based on the global training dataset 550 (e.g., the global training dataset 550 may include multiple document embedding representations 415C of the multiple pieces of communication 400).

In one embodiment, the document embedding vector 630 may represent the textual content 410 and also textual content extracted from one or more attachments included in the piece of content 400, if any.

In yet another embodiment, the textual content extraction unit 220 is configured to generate, for a piece of communication 400, at least two different types of representations of the piece of communication 400.

In one embodiment, one or more learning models (e.g., the word embedding learning model 230, the sentence embedding learning model 240, the document embedding learning model 250, etc.) utilized by the auto-triage system 200 is trained offline (i.e., not on the computing device 100). For example, a learning model may be trained on a remote server 60. After training, the learning model may be loaded onto/downloaded to the computing device 100 as a portion of the auto-triage system 200 for use in a deployment stage. In another embodiment, one or more learning models are trained on the computing device 100 itself.

For example, assume the piece of communication 400 is an incoming email comprising a message "Can you please send a slide with your current results, asap? Please let me know when you finish the poster." in a body of the email. The output 510 may indicate that the email includes at least two different actionable statements requiring two different action types (i.e., send a slide to a sender of the email, and let the sender know when the poster is finished).

In one embodiment, the auto-triage system 200 comprises an optional metadata extraction unit 210 configured to: (1) extract metadata information 420 from a piece of communication 400 for a user 30, and (2) generate a set of metadata features 425 (FIG. 5A) based on the metadata information 420 extracted. The set of metadata features 425 comprise one or more features extracted from the metadata information 420.

For example, if the piece of communication 400 is an incoming email for a user 30, the set of metadata features 425 may include, but are not limited to, the following: a list of all recipients of the email, a data value (e.g., a binary value) indicative of whether a sender of the email is included in an address book or contacts list of a software email application utilized by the user 30 (e.g., contacts list of an email inbox of the user 30), a data value (e.g., a binary value) indicative of whether the user 30 is included in the "To:" field of a header of the email, a data value (e.g., a binary value) indicative of whether the user 30 is included in the "CC:" field of the header, a data value (e.g., an integer value) representing a total number of recipients included in the "To:" field of the header, and a data value (e.g., an integer value) representing a total number of recipients included in the "CC:" field of the header.

Figure 5B:
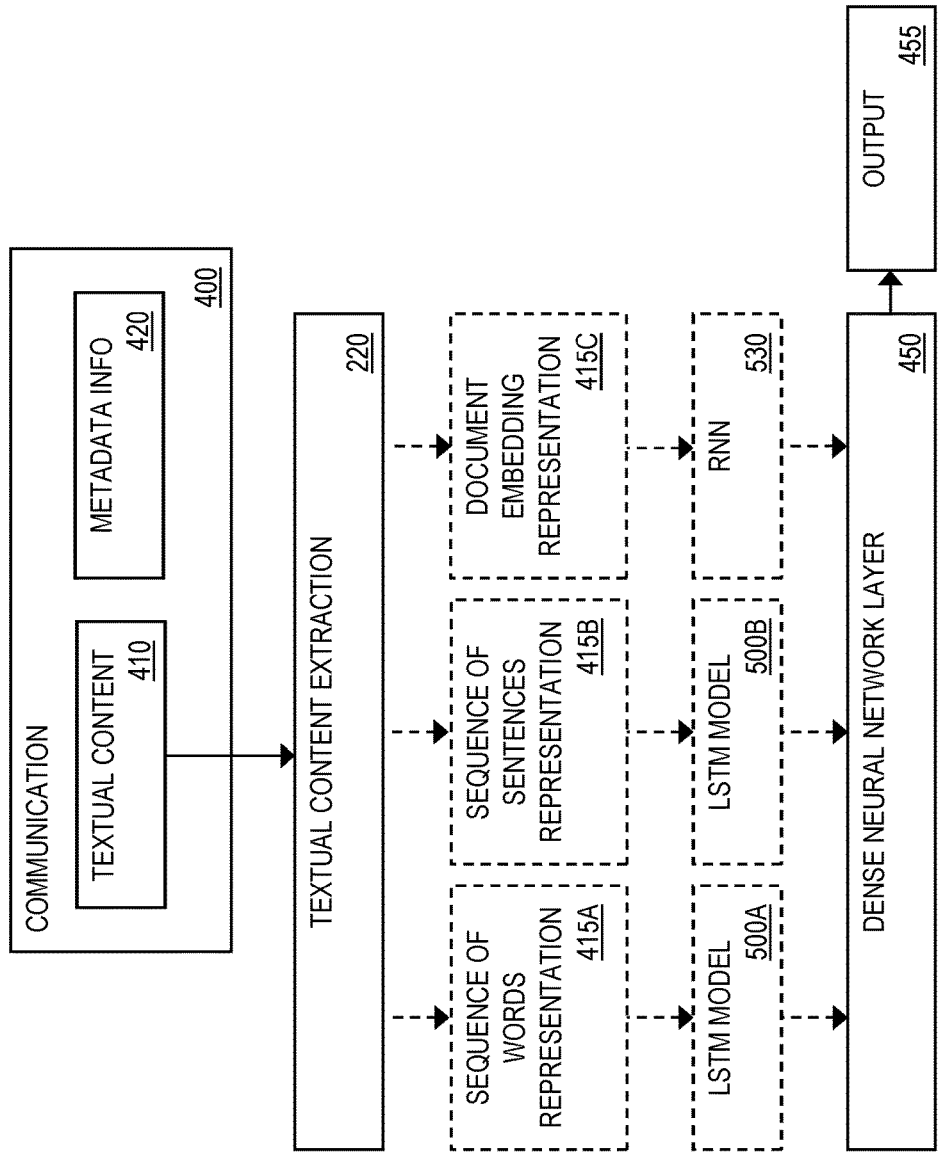
FIG. 5B illustrates another example process implemented by the auto-triage system for determining a priority label to assign to a piece of communication, in accordance with an embodiment of the invention.

In one embodiment, the auto-triage system 200 comprises one or more concatenation units 290 for concatenating different outputs generated by different components of the auto-triage system 200. If the auto-triage system 200 is both context aware and metadata aware (i.e., both textual content 410 and metadata information 420 are extracted from a piece of communication 400, as shown in FIG. 5A), the system 200 utilizes a first concatenation unit 290A to concatenate the output 510 generated by the representation processor 505 with the set of metadata features 425 generated by the metadata extraction unit 210 into a single vector that is then forwarded/fed to a first dense neural network layer 450 (FIG. 5A). If the auto-triage system 200 is context aware only (i.e., only textual content 410 is extracted from a piece of communication 400, as shown in FIG. 5B), the output 510 generated by the representation processor 505 is directly forwarded/fed to the first dense neural network layer 450 (FIG. 5A). If the auto-triage system 200 is metadata aware only (i.e., only metadata information 420 is extracted from a piece of communication 400), the set of metadata features 425 generated by the metadata extraction unit 210 is directly forwarded/fed to the first dense neural network layer 450 (FIG. 5A).

In one embodiment, the first dense neural network layer 450 is a global deep learning model 560 representing perceptions or points of view of multiple users 30 with respect to urgency and actionable aspects of a piece of communication ("global perspective"). In one embodiment, the first dense neural network layer 450 is trained as a global deep learner/classifier using deep learning and a global training dataset (e.g., the global training dataset 550 comprising multiple pieces of communication 400 for the multiple users 30). In response to receiving the single vector from the first concatenation unit 290A, the first dense neural network layer 450 is configured to generate an output 455 (FIG. 5A) comprising information indicative of a predicted degree of priority of the piece of communication 400 from the global perspective.

In one embodiment, the output 455 comprises a predicted priority score of the piece of communication 400. In another embodiment, the output 455 comprises, for each available priority label or pre-determined numerical range corresponding to the priority label, a predicted probability/likelihood that the piece of communication 400 is assigned the priority label or a priority score within the pre-determined numerical range. For example, the output 455 may include, but is not limited to, the following: (1) a first probability value representing a predicted probability/likelihood the piece of communication 400 is assigned the first priority label (i.e., the highest priority) or a priority score within a first pre-determined numerical range corresponding to the first priority label, (2) a second probability value representing a predicted probability/likelihood the piece of communication 400 is assigned the second priority label (i.e., the second highest priority) or a priority score within a second pre-determined numerical range corresponding to the second priority label, (3) a third probability value representing a predicted probability/likelihood the piece of communication 400 is assigned the third priority label (i.e., the third highest priority) or a priority score within a third pre-determined numerical range corresponding to the third priority label, and (4) a fourth probability value representing a predicted probability/likelihood the piece of communication 400 is assigned the fourth priority label (i.e., the least priority) or a priority score within a fourth pre-determined numerical range corresponding to the fourth priority label.

In one embodiment, the first dense neural network layer 450 generates the output 455 by applying a softmax function.

In one embodiment, weights (e.g., weights of synaptic connections) of the first dense neural network layer 450 may be adjusted by applying backward propagation of errors.

In one embodiment, the auto-triage system 200 is configured to receive at least two types of user feedback: (1) a first type of user feedback received in a training stage of the first dense neural network layer 450, and (2) a second type of user feedback received after the training stage (i.e., a deployment stage) of the first dense neural network layer 450. The first type of user feedback includes, but is not limited to, one or more expected priority labels specified/provided by a user 30 for one or more pieces of communication 400 included in a global training dataset used to train the first dense neural network layer 450 in the training stage. The second type of user feedback includes, but is not limited to, one or more expected priority labels specified/provided by a user 30 for one or more pieces of communication 400 classified by the first dense neural network layer 450 in the deployment stage. In the training/deployment stage, the auto-triage system 200 compares output from the first dense neural network layer 450 against the first/second type of user feedback to determine whether a predicted degree of priority of a piece of communication 400 matches a user-specified expected priority label for the piece of communication 400. If the predicted degree of priority does not match the user-specified expected priority label, the auto-triage system 200 applies backward propagation of errors to the first dense neural network layer 450 to train/re-train the neural network to output a predicted degree of priority that matches the user-specified expected priority label.

In one embodiment, the auto-triage system 200 comprises a data collection unit 260 configured to generate user behavioral information 265 (FIG. 5A) for an individual user 30. The user behavioral information 265 comprises information indicative of one or more changes in one or more individual behaviors of the user 30 with respect to manner in which the user interacts with K most recent pieces of communication 400 for the user 30, wherein K is a positive integer, and K>1.

In one embodiment, the data collection unit 260 selects the K most recent pieces of communication 400 for the user 30. For example, the user behavioral information 265 may identify, but is not limited to, one or more of the following: (1) changes in content of some of the selected pieces of communication 400 (e.g., changes in topics/subjects identified/referenced in some of the selected pieces of communication 400, such as a shift from a work-related topic to a vacation-related topic), (2) changes in how the user 30 interacts with and/or responds to some of the selected pieces of communication 400 (e.g., changes in days of a week and/or times of a day the user 30 responds to some of the selected pieces of communication 400, time zone changes, changes in amount of time since receipt of a selected piece of communication 400 for the user 30 to respond to the selected piece of communication 400, changes in marking/flagging some of the selected pieces of communication 400 as important, changes in leaving some of the selected pieces of communication 400 as unopened/unread, etc.), and (3) changes in other users/entities the user 30 interacts with or responds to (e.g., changes in people/contacts added to or removed from To: and/or CC: fields of some of the selected pieces of communication 400 that are emails, etc.). Further, if some of the K most recent pieces of communication 400 were previously assigned priority labels 520, the user behavioral information 265 may further include user feedback from the user 30 with respect to the assigned priority labels 520 (e.g., a user-specified expected priority label for a selected piece of communication, user feedback indicating a selected piece of communication 400 should be assigned a priority label 520 of a lower priority, user feedback confirming that a priority label 520 assigned to a selected piece of communication is accurate, etc.).

In one embodiment, the auto-triage system 200 comprises a principal component analysis (PCA) unit 270 configured to perform feature reduction on the user behavioral information 265 to generate output 275 (FIG. 5A) indicative of individual perceptions or points of view of the user 30 with respect to urgency and actionable aspects of a piece of communication. In one embodiment, the output 275 comprises a single vector representing top N principal components of the K most recent pieces of communication 400, wherein N is a positive integer, and N>1. The top N principal components identify one or more perceived priorities of the user 30 (e.g., topics, contacts/people, implicit priorities, etc.) based on the K most recent pieces of communication 400 (i.e., recent interaction history of the user 30).

In one embodiment, the auto-triage system 200 utilizes a second concatenation unit 290B to concatenate the output 455 generated by the first dense neural network layer 450 with the output 275 generated by the PCA unit 270 into a single vector that is then forwarded/fed to a classifier 460 (FIG. 5A). The classifier 460 is a personalized learning model 570 for the user 30 (i.e., specific to the user 30) representing individual perceptions or points of view of the user 30 with respect to urgency and actionable aspects of a piece of communication ("individual perspective of the user 30"). In one embodiment, the classifier 460 comprises another dense neural network layer. In another embodiment, the classifier 460 comprises a traditional classifier such as, but not limited to, a logistic regression model. In one embodiment, the output 275 is utilized as training data to train the personalized learning model 570 for the user 30.

In response to receiving the single vector from the second concatenation unit 290B, the classifier 460 is configured to generate an output 465 (FIG. 5A) comprising information indicative of a predicted degree of priority of the piece of communication 400 from both the global perspective and the individual perspective of the user 30 (i.e., as the single vector combines output from both the first dense neural network layer 450 and the PCA unit 270, the output 465 accounts for both the global deep learning model 560 and the personalized learning model 570 for the user 30).

In one embodiment, the output 465 comprises a predicted priority score of the piece of communication 400. The auto-triage system 200 maps the predicted priority score to a priority label corresponding to a pre-determined numerical range that includes the predicted priority score, and assigns the piece of communication 400 the priority label that the predicted priority score is mapped to. In another embodiment, the output 465 comprises, for each available priority label or pre-determined numerical range corresponding to the priority label, a predicted probability/likelihood that the piece of communication 400 is assigned the priority label or a priority score within the pre-determined numerical range. The auto-triage system 200 selects, based on the output 465, a priority label with the highest predicted probability/likelihood across all the available priority labels, and assigns the piece of communication 400 the priority label selected. For example, the output 465 may include, but is not limited to, the following: (1) a first probability value representing a predicted probability/likelihood the piece of communication 400 is assigned the first priority label (i.e., the highest priority) or a priority score within a first pre-determined numerical range corresponding to the first priority label, (2) a second probability value representing a predicted probability/likelihood the piece of communication 400 is assigned the second priority label (i.e., the second highest priority) or a priority score within a second pre-determined numerical range corresponding to the second priority label, (3) a third probability value representing a predicted probability/likelihood the piece of communication 400 is assigned the third priority label (i.e., the third highest priority) or a priority score within a third pre-determined numerical range corresponding to the third priority label, and (4) a fourth probability value representing a predicted probability/likelihood the piece of communication 400 is assigned the fourth priority label (i.e., the least priority) or a priority score within a fourth pre-determined numerical range corresponding to the fourth priority label. If the first priority label is the priority label with the highest predicted probability/likelihood, the auto-triage system 200 assigns the piece of communication 400 the priority label 520A with label name "Act Now".

FIG. 5A illustrates an example process implemented by the auto-triage system 200 for determining a priority label 520 to assign to a piece of communication 400, in accordance with an embodiment of the invention. As shown in FIG. 5A, in response to receiving an incoming piece of communication 400 for an individual user 30 (e.g., an incoming email, etc.), the auto-triage system 200 generates representation 415 (i.e., a sequence of words representation, a sequence of sentences representation, and a document embedding representation) of the piece of communication 400 based on textual content 410 extracted from the piece of communication 400. The auto-triage system 200 feeds the representation 415 to the representation processor 505 to obtain an output 510 identifying one or more actionable aspects of the piece of communication 400, if any.

The auto-triage system 200 generates a set of metadata features 425 based on metadata information 420 extracted from the piece of communication 400. The auto-triage system 200 concatenates the set of metadata features 425 with the output 510 from the representation processor 505 into a single vector, and feeds the single vector to the first dense neural network layer 450 to obtain an output 455 indicative of a predicted degree of priority of the piece of communication 400 from the global perspective (i.e., generalized perceptions or points of view of multiple users 30 with respect to urgency and actionable aspects of a piece of communication).

To determine individual perceptions or points of view of the user 30 with respect to urgency and actionable aspects of a piece of communication, the auto-triage system 200 generates user behavioral information 265 comprising information indicative of behaviors of the user 30 with respect to K most recent pieces of communication 400 for the user 30. The auto-triage system 200 feeds the user behavioral information 265 to the PCA unit 270 to obtain an output 275 indicative of top N principal components of the K most recent pieces of communication 400.

The auto-triage system 200 concatenates the output 275 from the PCA unit 270 with the output 455 from the first dense neural network layer 450 into a single vector, and feeds the single vector to the classifier 460 to obtain an output 465 indicative of a predicted degree of priority of the piece of communication 400 from both the global perspective and the individual perspective of the user 30. The auto-triage system 200 assigns the piece of communication 400 a priority label 520 based on the output 465.

FIG. 5B illustrates another example process implemented by the auto-triage system 200 for determining a priority label 520 to assign to a piece of communication 400, in accordance with an embodiment of the invention. In one embodiment, the metadata, in response to receiving an incoming piece of communication 400 for an individual user 30 (e.g., an incoming email, etc.), the auto-triage system 200 extracts only natural language content from the piece of communication 400 (i.e., metadata information is not extracted). Unlike the example process in FIG. 5A, the auto-triage system 200 in FIG. 5B is content aware only (i.e., the system 200 does not generate a set of metadata features). Specifically, the system 200 extracts textual content 410 from the piece of communication 400 via the textual content extraction unit 220. In one embodiment, the textual content extraction unit 220 generates a sequence of words representation 415A based on the textual content 410, and feeds the sequence of words representation 415A to a LSTM model (e.g., LSTM model 500A in FIG. 6A).

In another embodiment, the textual content extraction unit 220 generates a sequence of sentences representation 415B based on the textual content 410, and feeds the sequence of sentences representation 415B to a LSTM model (e.g., LSTM model 500B in FIG. 6B). Resulting output from the LSTM model is directly fed to the first dense neural network layer 450.

In yet another embodiment, the textual content extraction unit 220 generates a document embedding representation 415C based on the textual content 410, and feeds the document embedding representation 415B to a RNN (e.g., RNN 530 in FIG. 6C). Resulting output from the RNN is directly fed to the first dense neural network layer 450.

In one embodiment, output 455 from the first dense neural network layer 450 may be concatenated with output from the PCA unit 270, as shown in FIG. 5A.

FIG. 6A illustrates an example sequence of words representation 415A of a piece of communication 400, in accordance with an embodiment of the invention. The sequence of words representation 415A comprises a sequence of word embedding vectors 610. Each word 411 included in textual content 410 extracted from the piece of communication 400 is represented by a corresponding word embedding vector 610 that is included in the sequence of words representation 415A. For example, as shown in FIG. 6A, the sequence of words representation 415A comprises a first word embedding vector $X_1$ corresponding to a first word "please", a second word embedding vector $X_2$ corresponding to a second word "send", a third word embedding vector $X_3$ corresponding to a third word "me", . . . , and a last word embedding vector $X_n$ corresponding to an $n^{th}$ word "experiments", wherein n is a positive integer. Each word embedding vector 610 is fed to the LSTM model 500A to determine one or more actionable aspects of the piece of communication 400, if any.

In one embodiment, the LSTM model 500A comprises a learned artificial neural network with multiple neural nodes 501A, wherein each neural node 501A comprises one or more electronic neurons. The neural nodes 501A may be arranged as a feed forward chain that processes the sequence of word embedding vectors 610 in a sequential manner. Each neural node 501A of the feed forward chain is configured to receive a word embedding vector 610. For example, as shown in FIG. 6A, the first word embedding vector $X_1$ is fed/forwarded to a first neural node $NODE_1$ of the feed forward chain, the second word embedding vector $X_2$ is fed/forwarded to a second neural node $NODE_2$ of the feed forward chain, the third word embedding vector $X_3$ is fed/forwarded to a third neural node $NODE_3$ of the feed forward chain, and the last word embedding vector $X_n$ is fed/forwarded to another neural node 501A of the feed forward chain (e.g., $NODE_n$). With the exception of the first neural node $NODE_1$, each neural node 501A of the feed forward chain is further configured to receive output from a preceding neural node 501 of the feed forward chain. Output from a last neural node 501A of the feed forward chain (e.g., $NODE_n$) is provided as output 510 generated by the representation processor 505.

In one embodiment, when generating a sequence of words representation 415A of a piece of communication 400, the auto-triage system 200 ignores/bypasses certain words included in textual content 410 extracted from the piece of communication 400, such as definite articles like the word "the".

FIG. 6B illustrates an example sequence of sentences representation 415B of a piece of communication 400, in accordance with an embodiment of the invention. The sequence of sentences representation 415B comprises a sequence of sentence embedding vectors 620. Each sentence 412 included in textual content 410 extracted from the piece of communication 400 is represented by a corresponding sentence embedding vector 620 that is included in the sequence of sentences representation 415B. For example, as shown in FIG. 6B, the sequence of sentences representation 415B comprises a first sentence embedding vector $Y_1$ corresponding to a first sentence "please send me the report ASAP" and a second sentence embedding vector $Y_2$ corresponding to a second sentence "let me know when you finish the experiments". Each sentence embedding vector 620 is fed to the LSTM model 500B to determine one or more actionable aspects of the piece of communication 400, if any.

In one embodiment, the LSTM model 500B comprises a learned artificial neural network with multiple neural nodes 501B, wherein each neural node 501B comprises one or more electronic neurons. The neural nodes 501B may be arranged as a feed forward chain that processes the sequence of sentence embedding vectors 620 in a sequential manner. Each neural node 501B of the feed forward chain is configured to receive a sentence embedding vector 620. For example, as shown in FIG. 6B, the first sentence embedding vector $Y_1$ is fed/forwarded to a first neural node $NODE_1$ of the feed forward chain and the second word embedding vector $Y_2$ is fed/forwarded to a second neural node $NODE_2$ of the feed forward chain. With the exception of the first neural node $NODE_1$, each neural node 501B of the feed forward chain is further configured to receive output from a preceding neural node 501B of the feed forward chain. Output from a last neural node 501B of the feed forward chain (e.g., $NODE_2$) is provided as output 510 generated by the representation processor 505.

FIG. 6C illustrates an example document embedding representation 415C of a piece of communication 400, in accordance with an embodiment of the invention. The document embedding representation 415C comprises a single document embedding vector 630. A whole document 413 included in textual content 410 extracted from the piece of communication 400 is represented by the document embedding vector 630. For example, as shown in FIG. 6C, the document embedding representation 415C comprises a document embedding vector $Z_1$ corresponding to an entire message "please send me the report ASAP . . . finish the experiments" (i.e., the entirety of the textual content 410 as a whole). The document embedding vector 630 is fed/forwarded to the RNN 530. Output from the RNN 530 is provided as output 510 generated by the representation processor 505.

Figure 7:
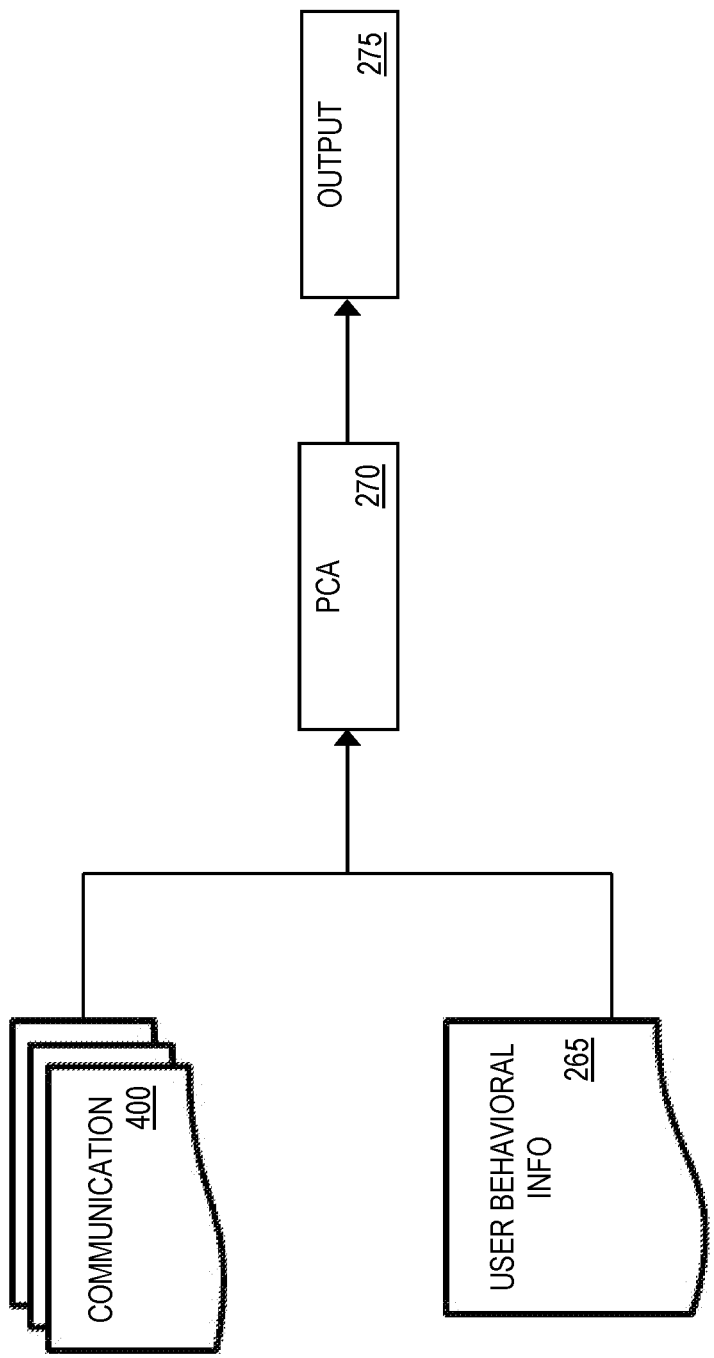
FIG. 7 illustrates an example process implemented by the auto-triage system for determining individual perceptions or points of view of a user with respect to urgency and actionable aspects of a piece of communication, in accordance with an embodiment of the invention.

FIG. 7 illustrates an example process implemented by the auto-triage system 200 for determining individual perceptions or points of view of a user 30 with respect to urgency and actionable aspects of a piece of communication, in accordance with an embodiment of the invention. The auto-triage system 200 generates user behavioral information 265 indicative of individual behaviors of the user 30 with respect to K most recent pieces of communication 400. The auto-triage system 200 feeds the K most recent pieces of communication 400 and the user behavioral information 265 to the PCA unit 270 and obtain an output 275 comprising a single vector representing top N principal components of the K most recent pieces of communication 400. The top N principal components identify one or more perceived priorities of the user 30 (e.g., topics, contacts/people, implicit priorities, etc.).

FIG. 6C illustrates an example document embedding representation 415C of a piece of communication 400, in accordance with an embodiment of the invention. The document embedding representation 415C comprises a single document embedding vector 630. A whole document 413 included in textual content 410 extracted from the piece of communication 400 is represented by the document embedding vector 630. For example, as shown in FIG. 6C, the document embedding representation 415C comprises a document embedding vector $Z_0$ corresponding to an entire message "please send me the report ASAP . . . finish the experiments" (i.e., the entirety of the textual content 410 as a whole). The document embedding vector 630 is fed/forwarded to the RNN 530. Output from the RNN 530 is provided as output 510 generated by the representation processor 505.

FIG. 7 illustrates an example process implemented by the auto-triage system 200 for determining individual perceptions or points of view of a user 30 with respect to urgency and actionable aspects of a piece of communication, in accordance with an embodiment of the invention. The auto-triage system 200 generates user behavioral information 265 indicative of individual behaviors of the user 30 with respect to K most recent pieces of communication 400. The auto-triage system 200 feeds the K most recent pieces of communication 400 and the user behavioral information 26 to the PCA unit 270 obtain an output 275 comprising a single vector representing top N principal components of the K most recent pieces of communication 400. The top N principal components identify one or more perceived priorities of the user 30 (e.g., topics, contacts/people, implicit priorities, etc.).

Figure 8:
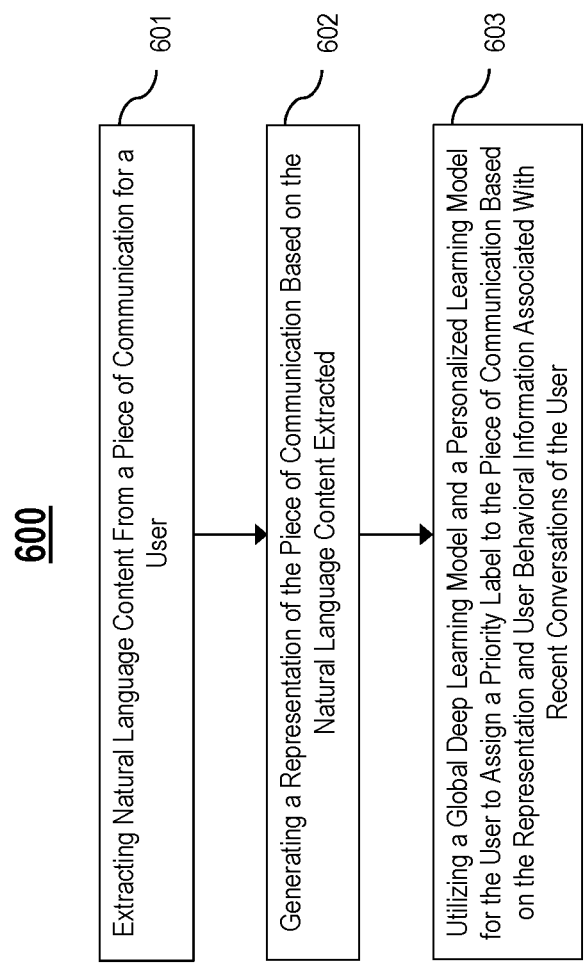
FIG. 8 is a flowchart of an example process for assigning a priority label to a piece of communication, in accordance with an embodiment of the invention.

FIG. 8 is a flowchart of an example process 600 for assigning a priority label to a piece of communication, in accordance with an embodiment of the invention. In process block 601, extract natural language content from a piece of communication for a user. In process block 602, generate a representation of the piece of communication based on the natural language content extracted. In process block 603, utilize a global deep learning model and a personalized learning model for the user to assign a priority label of the piece of communication based on the representation and user behavioral information associated with recent conversations of the user.

In one embodiment, process blocks 601-603 may be performed by one or more components of the auto-triage system 200.

Figure 9:
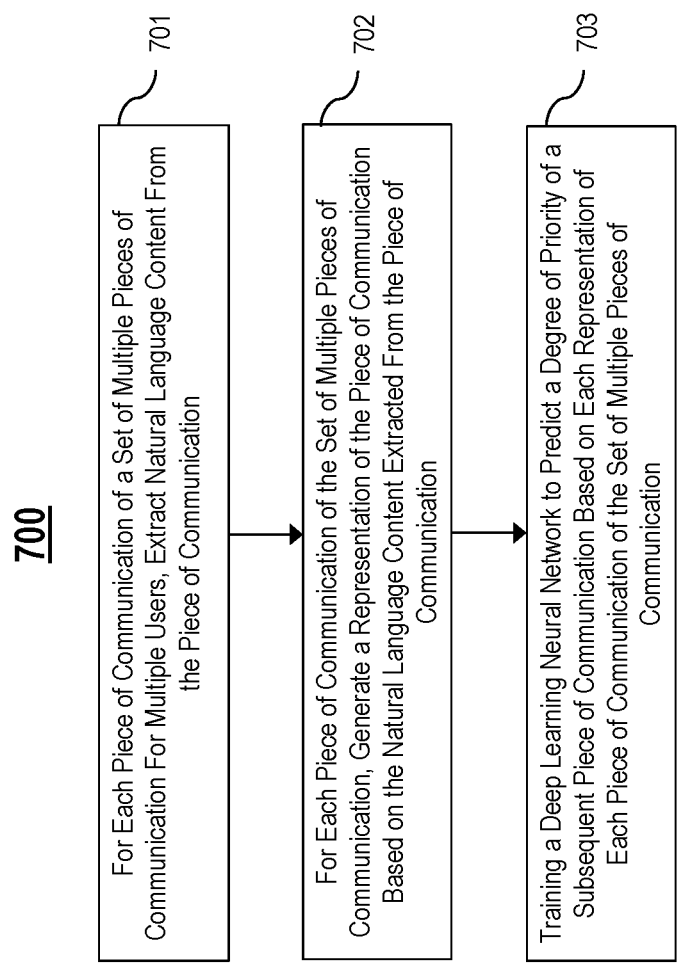
FIG. 9 is a flowchart of an example process training a global deep learning model, in accordance with an embodiment of the invention.

FIG. 9 is a flowchart of an example process 700 training a global deep learning model, in accordance with an embodiment of the invention. In process block 701, for each piece of communication of a set of multiple pieces of communication for multiple users, extract natural language content from the piece of communication. In process block 702, for each piece of communication of the set, generate a representation of the piece of communication based on the natural language content extracted from the piece of communication. In process block 703, train a deep learning neural network to predict a degree of priority of a subsequent piece of communication based on each representation of each piece of communication of the set.

In one embodiment, process blocks 701-703 may be performed by one or more components of the auto-triage system 200.

Figure 10:
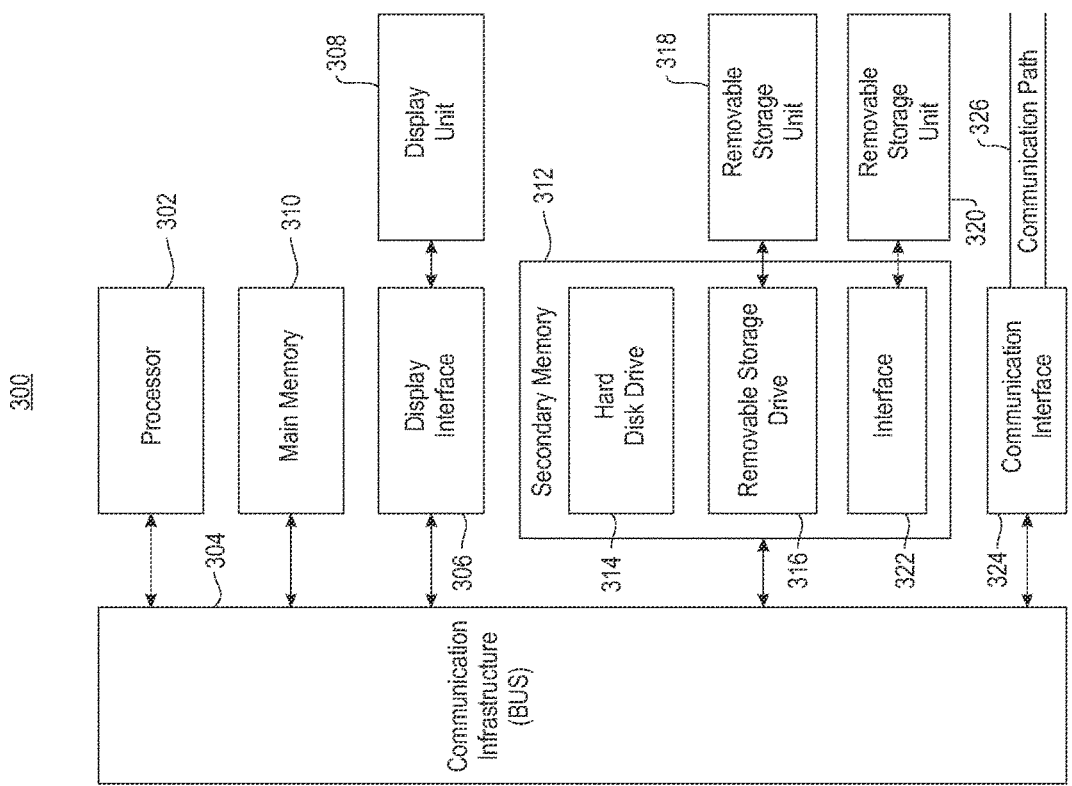
FIG. 10 is a high level block diagram showing an information processing system useful for implementing an embodiment of the present invention.

FIG. 10 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    extracting natural language content from a piece of communication for a user;
    generating a representation of the piece of communication based on the natural language content extracted;
    generating, utilizing a global deep learning model, a first predicted degree of priority of the piece of communication from a perspective of multiple users based on the representation;
    generating, utilizing a personalized learning model for the user, a second predicted degree of priority of the piece of communication from both the perspective of the multiple users and an individual perspective of the user based on the first predicted degree of priority and user behavioral information associated with previous conversations of the user; and
    assigning a priority label to the piece of communication based on the second predicted degree of priority.

2. The method of claim 1, wherein the user behavioral information is indicative of one or more changes in one or more behaviors of the user with respect to manner in which the user interacts with a pre-determined number of previous pieces of communication for the user.

3. The method of claim 2, further comprising:
    performing feature reduction on the user behavioral information to obtain a pre-determined number of principal components of the previous conversations of the user; and
    training the personalized learning model for the user based on the principal components obtained.

4. The method of claim 3, further comprising:
    extracting metadata information from the piece of communication; and
    generating a set of metadata features based on the metadata information extracted;
    wherein the priority label assigned is further based on the set of metadata features.

5. The method of claim 1, wherein:
    the representation is a sequence of words representation; and
    the method further comprises:
        learning a word embedding space by training a neural network based on a global training dataset comprising multiple pieces of communication for multiple users.

6. The method of claim 1, wherein:
    the representation is a sequence of sentences representation; and
    the method further comprises:
        learning a sentence embedding space by training a distributed representation learner based on a global training dataset comprising multiple pieces of communication for multiple users.

7. The method of claim 1, wherein:
    the representation is a document embedding representation; and
    the method further comprises:
        learning a document embedding space by training a distributed representation learner based on a global training dataset comprising multiple pieces of communication for multiple users.

8. The method of claim 4, further comprising:
    training the global deep learning model using a global training dataset comprising multiple pieces of communication for multiple users.

9. The method of claim 8, further comprising:
    training a long short-term memory (LSTM) model based on multiple representations of the multiple pieces of communication included in the global training dataset;
    combining an output of the LSTM model with metadata features of the multiple pieces of communication included in the global training dataset into a first vector; and
    feeding the first vector into a first dense neural network layer trained to predict a degree of priority of the piece of communication based on the global deep learning model.

10. The method of claim 9, further comprising:
    combining an output of the first dense neural network layer with the principal components obtained into a second vector; and
    feeding the second vector into a classifier trained to predict a degree of priority of the piece of communication based on both the global deep learning model and the personalized learning model for the user.

11. The method of claim 1, wherein the piece of communication comprises an email.

12. The method of claim 1, further comprising:
    for each piece of communication of a set of multiple pieces of communication for multiple users:
        extracting natural language content from the piece of communication; and
        generating a representation of the piece of communication based on the natural language content extracted; and training a deep learning neural network to predict a degree of priority of a subsequent piece of communication based on each representation generated.

13. The method of claim 12, further comprising:
for each piece of communication of the set of multiple pieces of communication:
extracting metadata information from the piece of communication; and
generating a set of metadata features based on the metadata information extracted;
wherein the deep learning neural network is further trained based on each set of metadata features generated.

14. The method of claim 13, further comprising:
training a long short-term memory (LSTM) model based on each representation of each piece of communication of the set of multiple pieces of communication;
combining an output of the LSTM model with each set of metadata features generated into a first vector;
feeding the first vector into a first dense neural network layer trained to predict priority of the set of multiple pieces of communication; and
adjusting weights on the deep learning neural network using backward propagation of errors and user feedback.

15. A system comprising:
at least one processor; and
a non-transitory processor-readable memory device storing instructions that when executed by the at least one processor causes the at least one processor to perform operations including:
extracting natural language content from a piece of communication for a user;
generating a representation of the piece of communication based on the natural language content extracted;
generating, utilizing a global deep learning model, a first predicted degree of priority of the piece of communication from a perspective of multiple users based on the representation;
generating, utilizing a personalized learning model for the user, a second predicted degree of priority of the piece of communication from both the perspective of the multiple users and an individual perspective of the user based on the first predicted degree of priority and user behavioral information associated with previous conversations of the user; and
assigning a priority label to the piece of communication based on the second predicted degree of priority.

16. The system of claim 15, wherein the user behavioral information is indicative of one or more changes in one or more behaviors of the user with respect to manner in which the user interacts with a pre-determined number of previous pieces of communication for the user.

17. The system of claim 16, wherein the operations further comprise:

performing feature reduction on the user behavioral information to obtain a pre-determined number of principal components of the previous conversations of the user; and
training the personalized learning model for the user based on the principal components obtained.

18. The system of claim 17, wherein the operations further comprise:
extracting metadata information from the piece of communication; and
generating a set of metadata features based on the metadata information extracted;
wherein the priority label assigned is further based on the set of metadata features.

19. The system of claim 18, wherein the operations further comprise:
training the global deep learning model using a global training dataset comprising multiple pieces of communication for multiple users;
training a long short-term memory (LSTM) model based on multiple representations of the multiple pieces of communication included in the global training dataset;
combining an output of the LSTM model with metadata features of the multiple pieces of communication included in the global training dataset into a first vector;
feeding the first vector into a first dense neural network layer trained to predict a degree of priority of the piece of communication based on the global deep learning model;
combining an output of the first dense neural network layer with the principal components obtained into a second vector; and
feeding the second vector into a classifier trained to predict a degree of priority of the piece of communication based on both the global deep learning model and the personalized learning model for the user.

20. A computer program product comprising a non-transitory computer-readable storage medium having program code embodied therewith, the program code being executable by a computer to implement a method comprising:
extracting natural language content from a piece of communication for a user;
generating a representation of the piece of communication based on the natural language content extracted;
generating, utilizing a global deep learning model, a first predicted degree of priority of the piece of communication from a perspective of multiple users based on the representation;
generating, utilizing a personalized learning model for the user, a second predicted degree of priority of the piece of communication from both the perspective of the multiple users and an individual perspective of the user based on the first predicted degree of priority and user behavioral information associated with previous conversations of the user; and
assigning a priority label to the piece of communication based on the second predicted degree of priority.

* * * * *